United States Patent Office 3,450,635
Patented June 17, 1969

3,450,635
NICKEL FERRITES CONTAINING COBALT, LEAD AND SILICON
Evgenia Valentinovna Izergina, Novo-Izmailovsky pr. 33, kv. 6; Georgy Konstantinovich Yakovlev, Per. Povarskoi 3/5, kv. 11; Antonina Dmitrievna Zakharova, Ul. Altaiskaya 31, kv. 44; and Nikolai Egorovich Komin, Naberezhnaya Fontanki 119, kv. 4, all of Leningrad, U.S.S.R.
No Drawing. Filed Dec. 15, 1965, Ser. No. 514,126
Int. Cl. C04b $35/30$; H01f $1/10$
U.S. Cl. 252—62.59    4 Claims

ABSTRACT OF THE DISCLOSURE

Novel ferrites are produced by sintering a mixture consisting essentially of iron, nickel, lead and cobalt oxides and silicon dioxide, with the iron oxide being present in less than a stoichiometric amount.

---

The present invention relates to methods of producing magnetic materials, intended for the use in the cores of coils with variable induction high-frequency circuits which are used in powerful retunable generators for various purposes in the frequency range of 50 to 200 mc./s.

There is known in the art a method of producing ferrites by sintering a mixture of oxides of the following composition (in mol percent):

| | |
|---|---|
| $Fe_2O_3$ | 52 to 70 |
| NiO | 25 to 45 |
| CoO | 5 to 12 |

These known ferrites are characterized by slight losses in weak high-frequency fields. These ferrites, however, cannot be employed in coils with variable induction high-frequency circuits, operating in intense high-frequency fields with additional magnetization, because with an insignificant variation in the percentage of iron oxide in the chemical composition above the stoichiometric amount and particularly with the presence of cobalt oxide there develops the so-called Perminvar effect which excludes the possibility of using materials when magnetizing with a magnetic field on account of a marked increase in the magnetic losses. Besides, the known ferrites have only low values of the magnetic permeability and hence a low coefficient of frequency retuning.

An object of the present invention is to provide a method of manufacturing ferrites, to be employed in high-frequency fields with magnetization in a frequency range from 50 to 200 mc./s.

According to this and other objects, in the proposed method of manufacturing ferrites by sintering a mixture, containing iron oxide, nickel oxide and cobalt oxide, in conformity with the present invention, into the mixture there are introduced additives which are oxides of lead and silicon with the content of iron oxide being below the stoichiometric amount.

To prepare the starting mixture, there are taken in mol. percent: iron oxide—40 to 49.5; nickel oxide—39.5 to 59; lead oxide—0.5 to 5; cobalt oxide—0.25 to 3, and silicon dioxide—0.25 to 3.

According to the proposed method of manufacturing ferrites, the starting oxides of iron, nickel, cobalt, lead and silicon are mixed and sintered at a temperature of 800 to 900° C., and are then subjected to the vibratory grinding.

The ground mixture is pressed into parts at a specific pressure of 1 to 2 t./sq. cm. Polyvinyl alcohol or carboxymethylcellulose is employed as a binder. The pressed parts are dried and fired in air at a temperature of 1000 to 1120° C. for a period of 3 to 6 hours.

The present invention will become more fully apparent from a consideration of the description of an exemplary embodiment of the method of production of ferrite from a mixture, containing (in mol. percent):

| | |
|---|---|
| $Fe_2O_3$ | 49.5 |
| NiO | 48.0 |
| CoO | 1.0 |
| PbO | 0.5 |
| $SiO_2$ | 1.0 |

The above oxides in indicated amounts are mixed up in a vibratory mill for 1 hour. The ratio of balls to the charge when charging the vibrating mill must be equal to 10:1.

The obtained mixture is fired in chamber or tunnel furnaces at a temperature of 850° C. for 4 hours. The fired mixture is ground in the vibrating mill for one hour. A moulding powder is then made from ground mixture by adding thereto about 10 to 12% of a binder. A 10 percent solution of polyvinyl alcohol is employed as said binder. The moulding powder is used to press at $P=2$ t./sq. cm. a core having dimensions 30 x 20 x 6 mm. or of other shapes. The parts thus obtained are dried in air at a rated temperature for 24 hours or in cabinet driers at a temperature of 80° C. for a period of several hours. The parts are fired in chamber or tunnel furnaces in an air atmosphere at a temperature of 1040 to 1070° C. for a period of 4 hours. The temperature is raised gradually over 10 hours. The cooling is carried out together with the furnace.

The ferrites obtained by the proposed method have the following electromagnetic characteristics: initial magnetic permeability $\mu_H=10$ to 14; coefficient of magnetic losses with $f=50$ mc./s. and $$H_\sim = 5 \text{ oe.}$$

tan $\delta=0.026$; coefficient of magnetic losses with $f=150$ mc./s. and $$H_\sim = 5 \text{ oe.}$$

tan $\delta=0.04$ to 0.06 with the superposition of a magnetizing field having an intensity of 700 to 800 oe.; the magnetic permeability under the condition of remanence magnetization varying not less than 4 times; Curie point equal to 500° C.

What is claimed is:
1. A method for producing ferrites, said method comprising sintering a mixture consisting essentially of 40 to 49.5 mol percent of iron oxide, 39.5 to 59 mol percent nickel oxide, 0.5 to 5 mol percent of lead oxide, 0.25 to 3 mol percent of cobalt and 0.25 to 3 mol percent of silicon dioxide; said iron oxide being present in the mixture in an amount less than the stoichiometric amount.
2. A method as claimed in claim 1 wherein the mixture consists of 49.5 mol percent of iron oxide, 48.0 mol percent of nickel oxide, 1.0 mol percent of cobalt oxide, 1.0 mol percent of silicon dioxide and 0.5 mol percent of lead oxide.
3. The ferrites produced by the process as claimed in claim 1.
4. The ferrite produced by the process as claimed in claim 2.

References Cited

UNITED STATES PATENTS

| | | | |
|---|---|---|---|
| 2,927,898 | 3/1960 | Pawlek | 252—62.59 |
| 3,113,927 | 12/1963 | Cochardt | 252—62.59 |
| 3,232,877 | 2/1966 | Vassiliev et al. | 252—62.56 |

TOBIAS E. LEVOW, *Primary Examiner.*
J. COOPER, *Assistant Examiner.*

U.S. Cl. X.R.
252—62.62